(No Model.)
N. ROGGY.
CULTIVATOR.
No. 366,258.   Patented July 12, 1887.
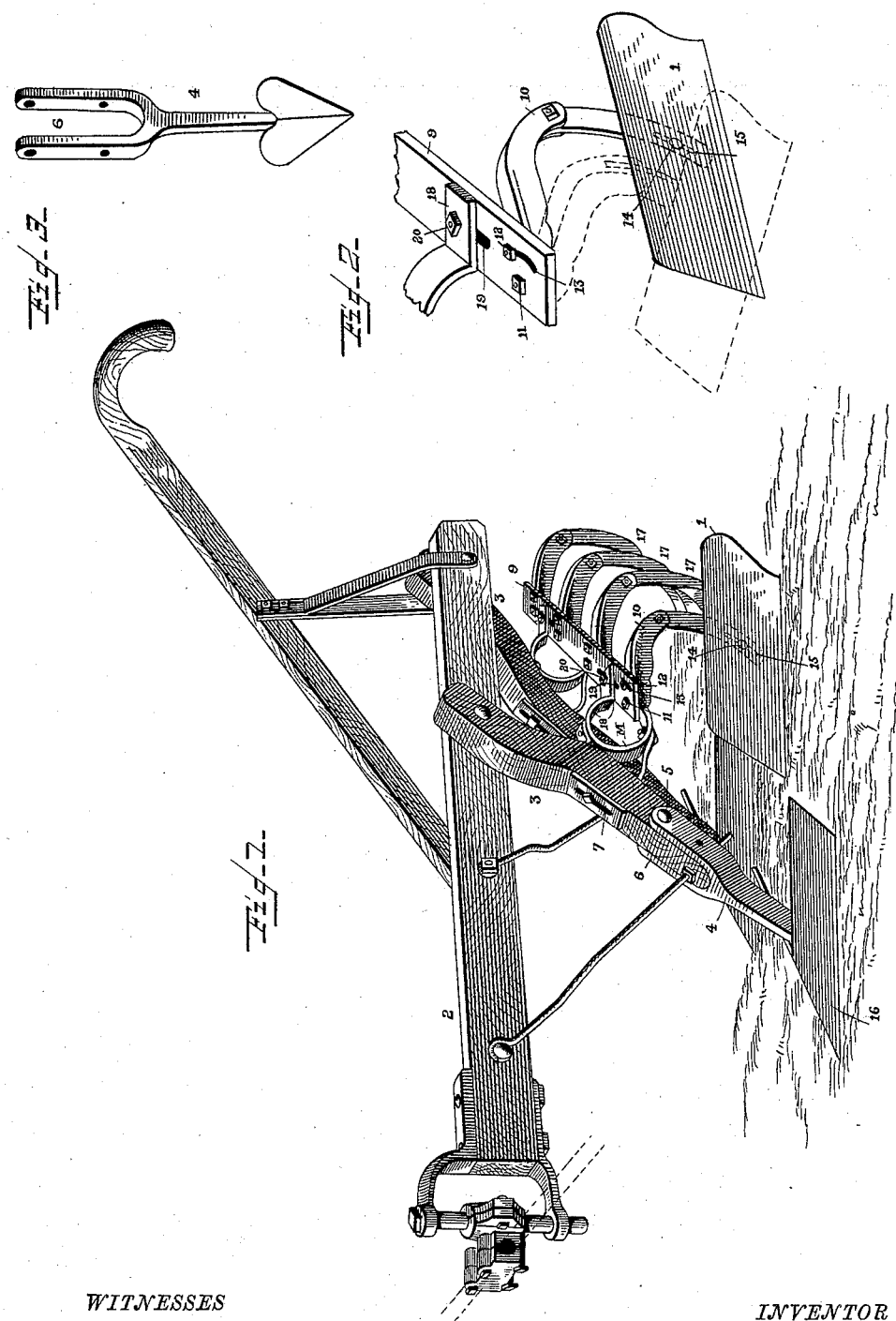
WITNESSES
Edwin L. Yewell
Wm. F. Huntemann,
INVENTOR
Nicholas Roggy.
By Manahan and Ward
his Attorney

UNITED STATES PATENT OFFICE.

NICHOLAS ROGGY, OF WALNUT, ILLINOIS.

CULTIVATOR.

SPECIFICATION forming part of Letters Patent No. 366,258, dated July 12, 1887.

Application filed April 16, 1887. Serial No. 235,110. (No model.)

*To all whom it may concern:*

Be it known that I, NICHOLAS ROGGY, a citizen of the United States, residing at Walnut, in the county of Bureau and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in cultivators, consisting, essentially, in certain novel and useful additions to and improvements upon the implement for which Letters Patent of the United States No. 350,506 were granted me October 12, 1886.

The implement shown in the patent last referred to was practically successful to the extent of loosening the ground and killing the weeds; but the custom has almost universally obtained in the corn-growing country of hilling the corn somewhat during the last cultivation thereof, and it is with reference to this finishing course that my present improvements are particularly applicable.

In the drawings, Figure 1 is a side perspective of the machine embodying my invention. Fig. 2 is a detail of the vertical blade at each end of its lateral swing; and Fig. 3, my improved stem for the forward knives, 16.

The construction of my former machine is followed in the main in the present machine, with some slight changes, hereinafter mentioned. The machine in its entirety is what is known as a "double" or "straddle-row" cultivator; but inasmuch as each half thereof is a counterpart of the other half, I do not deem it necessary to show or describe more than one half. In Fig. 1 the side of the machine next the observer is the side thereof next the row which is straddled by the machine. In lieu of what was a simple cultivator tooth or pulverizer next to the row of corn, I have substituted the vertical blade 1 for the double purpose of moving the earth to the row during the last stages of cultivation and covering up any weeds that may have been growing within or so closely to the hill of corn as to have been theretofore undisturbed. The draft-beam 2 is attached adjustably at its forward end to the usual axle of the ordinary carrying-wheels, and has suitably attached thereto, near its rear end, the knife-standards 3. To the lower ends of the standards 3 are respectively attached the shanks 4 of the forward knives, which latter, as in my former construction, are designed to run beneath the surface of the ground. The shanks 4, instead of being seated against the front side of the standards 3, as in said former construction, are here provided with bifurcated upper ends, 6, seated on the sides of the lower end of the standards 3, and held in place by transverse bolts 5. This construction affords greater security against lateral oscillation of the knives; also, a vertical slot, 7, is formed in the standards 3, through which the shank or draft-bolt of the grip M is projected, and means thereby afforded for vertically adjusting the said grip M. A cross-bar, 9, is adjustably attached to the grip M, as described in said former patent. The shank 10 of the blade 1 is attached to the cross-bar 9 by two bolts, 11 and 12. The front bolt, 11, passes through a vertical hole in the bar 9 and a corresponding hole in the front end of the shank 10. The bolt 12 is seated at its upper end in a segmental-slot, 13, in the cross-bar 9, and passes down through the shank 10 in the rear of the bolt 11. By means of the segmental slot 13, after loosening the bolt 12, the shank 10 can be swung laterally to or from the corn and fastened by the bolt 12 in any desired position in said slot. The vertical blade 1 is attached to its shank 10 by one transverse bolt, 14, the head of which is countersunk in the outer surface of the blade 1, so as to offer no obstruction to the passage of the earth, and the rear end of which is seated in the vertical slot 15, formed in the shank 10. By means of the vertical slot 15 the blade 1 can be seated at any altitude, and by means of the pivotal character of the bolt 14 the blade 1 can be adjusted at any inclination or angle to the surface of the ground. In the first use of the blade 1, and when the corn is smaller, said blade is seated so high in the slot 15 that it will carry but a comparatively small amount of earth to the corn. As the corn becomes larger the blade 1 is lowered in the slot 15, so that its lower or scraping edge shall be on the same plane as the lower surface of the forward knives, 16; also, in the early stages of cultivation the blade 1 is seated less obliquely to the line of draft by moving the bolt 12 in the shank 10 to the outer end of the slot 13, in which position said blade will move the earth laterally but a short distance, and as the corn becomes older and stronger the blade 1 is set more obliquely to and at a greater angle with the line of movement, the result being that the earth is delivered to the row of corn in greater quantity and from a greater distance. It is impracticable to swing the rear end of the blade 1 nearer the corn than the line of the inner knife, 16, for the reason that it would prevent running said knife sufficiently close to the row of corn for effective work; but to permit the required obliquity of the blade 1 without projecting its rear end beyond the inner line of the inner knife, 16, and also to provide means for centralizing the draft of the blade 1 to the three remaining pulverizers 17, slots 19 are formed transversely of the machine in the bar 9, through which are passed bolts 20, which are attached to clips 18 of the bar 9, whereby said bar 9 in the later cultivation of the corn can be moved laterally away from the straddled row to permit the necessary obliquity of the blade 1 without extending the rear end of the latter beyond the inner edge of the inner knife, 16.

I am aware blades more or less vertical have been used in corn-cultivation both to loosen and move the earth; but in my construction the blade 1, following, as it does, the knife 16, and at no time reaching below the cutting-surface of the latter, has nothing to do with loosening the earth, but simply moves laterally more or less of the earth already loosened by the knife, under which condition, I think, the best results are attained.

The foregoing adjustment of both depth of insertion of the blade 1 and its angle with the line of draft and to the row of corn adapts said blade to be used with great efficiency under all the varying conditions of the size or condition of the corn.

What I claim as my invention, and desire to secure by Letters Patent of the United States, is—

1. In a cultivator, the combination, with the cultivator-standards, of the clips 18, transverse bar 9, provided with slots 19, bolts 20, and the blade 1, and standards 10, adjustably attached to said bar 9, substantially as shown, and for the purpose described.

2. In a cultivator, the combination of the bar 9, provided with slots 19, clips 18, bolts 20, bolt 11, segmental slot 13, and bolt 12, and the blade 1, provided with shank 10, whereby said blade is given any lateral angle desired, and at the same time rendered susceptible of lateral adjustability, substantially as shown, and for the purpose described.

In testimony whereof I affix my signature in presence of two witnesses.

NICHOLAS ROGGY.

Witnesses:
ISABEL MANAHAN,
CHATTIE L. MANAHAN.